United States Patent
Ojha et al.

(10) Patent No.: US 12,071,155 B2
(45) Date of Patent: Aug. 27, 2024

(54) VEHICLE DRIVER WARNING DEVICE

(71) Applicant: Volvo Truck Corporation, Gothenburg (SE)

(72) Inventors: Vijay Ojha, Karnataka (IN); Anandhu Krishna, Kerala (IN); Dushyanth S, Tamil Nadu (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 22 days.

(21) Appl. No.: 18/070,864

(22) Filed: Nov. 29, 2022

(65) Prior Publication Data

US 2023/0174094 A1 Jun. 8, 2023

(30) Foreign Application Priority Data

Dec. 7, 2021 (EP) ..................................... 21212686

(51) Int. Cl.
*B60W 50/16* (2020.01)
*B60W 50/14* (2020.01)

(52) U.S. Cl.
CPC ....... *B60W 50/16* (2013.01); *B60W 2050/143* (2013.01); *B60W 2050/146* (2013.01); *B60W 2540/18* (2013.01)

(58) Field of Classification Search
CPC ........... B60W 50/16; B60W 2050/143; B60W 2050/146; B60W 2540/18
See application file for complete search history.

(56) References Cited

U.S. PATENT DOCUMENTS 4,611,199 A * 9/1986 Seko ...................... A61B 5/746
340/576
7,710,279 B1 * 5/2010 Fields .................. B60K 28/066
340/576

(Continued)

FOREIGN PATENT DOCUMENTS

DE 102017200453 A1 7/2017
EP 1894813 A2 3/2008
FR 3001430 A1 8/2014

OTHER PUBLICATIONS

European Search Report, EP 21212686.6, mailed Apr. 21, 2022, 4 pages.

*Primary Examiner* — Mohamed Barakat
(74) *Attorney, Agent, or Firm* — Sage Patent Group

(57) ABSTRACT

A vehicle driver warning device includes:
a steering angle sensor (SAS) producing steering signals representative of a real time angle of rotation of a steering column (RTARSC),
a control unit receiving said signals and generating a timer activation signal (TAS) when an absolute value of the RTARSC is equal to a maximum value and a timer deactivation signal (TDS) when the absolute value is less than the maximum value after being equal to the maximum value,
a timer receiving the TAS and starting a preset period of time countdown and interrupting said countdown if the TDS is received before the countdown ends,
an alarm module generating an alarm perceptible to the driver upon receiving an alarm activation signal (AAS),
wherein the control unit generates and communicates the AAS to the alarm module at the end of the preset period of time if the countdown has not been interrupted.

15 Claims, 1 Drawing Sheet

(56) References Cited

U.S. PATENT DOCUMENTS

| | | | |
|---|---|---|---|
| 2008/0211651 A1* | 9/2008 | Beutnagel-Buchner | ..................... B62D 1/06 340/459 |
| 2014/0353073 A1* | 12/2014 | Banno | ................... B62D 15/021 180/446 |
| 2016/0052542 A1* | 2/2016 | Pugsley | ............... B62D 5/0496 701/41 |
| 2017/0197654 A1* | 7/2017 | Kim | ..................... B62D 5/0463 |

* cited by examiner

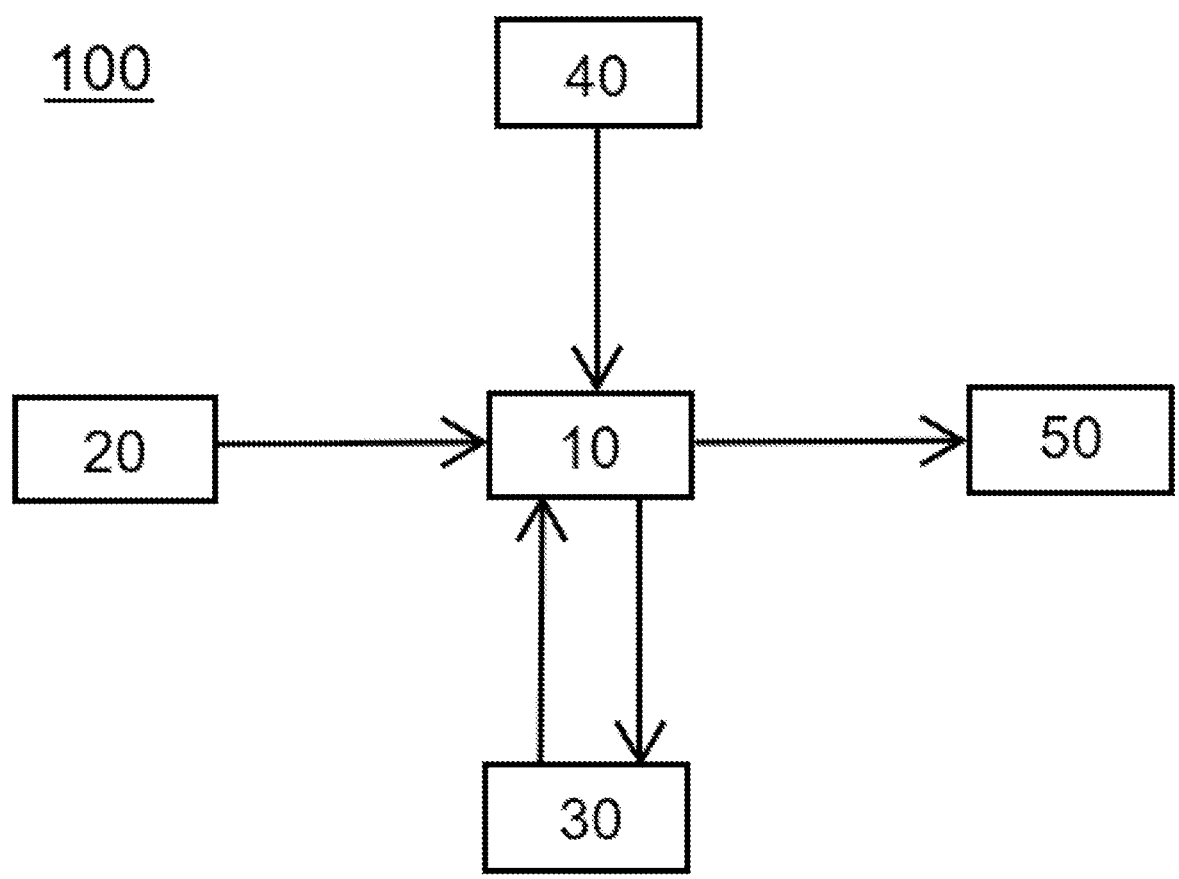

VEHICLE DRIVER WARNING DEVICE

CROSS REFERENCE TO RELATED APPLICATIONS

This application claims priority to European Patent Application No. 21212686.6 filed on Dec. 7, 2021, the disclosure and content of which is incorporated by reference herein in its entirety.

TECHNICAL FIELD

The invention relates to a vehicle driver warning device.

The invention can be applied in heavy-duty vehicles, such as trucks, buses and construction equipment, or in other vehicles, such as a car.

BACKGROUND

Conventional vehicles are fitted with a steering wheel to control the orientation of the wheels. Such a steering wheel is made up of a steering wheel ring, a hub and one or more radial spokes that connect the steering wheel ring to the hub. The steering wheel hub causes a steering shaft to rotate.

These conventional vehicles may be equipped with an electrohydraulic power steering system in which an oil pump supplies hydraulic oil to a power cylinder, thus decreasing an operating force needed to turn the steering wheel. Generally, it is necessary to supply a large current to the electric motor to drive the oil pump. Therefore, heat generation may considerably increase in the motor driving circuit during the operation of the steering wheel. In particular, the heat generation may excessively increase at an abutting state of the steering system, where a rack gear is steered by the operation of the steering wheel to a right or left end position and a steering force is kept applied, a load of the oil pump is maximum and the maximum current continues to flow to the electric motor. This abutting state corresponds to a full lock position of the steering wheel. If the steering wheel is kept in this full lock position for more than a specified time, this may lead to an excessive heating of the steering oil, which may cause potential damage of the oil pump, and to an excessive load applied to the rack gear and to the steering shaft, which may be mechanically fractured.

To avoid these problems, cautions are generally given to the vehicle driver through owner manuals and service manuals that the steering wheel should not be held in full lock condition for more than a specified time, for example 5 seconds. However, such cautions are not always read or practised by every driver, which in turn causes damage to power steering system and reduces its durability.

SUMMARY

An object of the present disclosure is to provide a vehicle driver warning device, which can warn the driver in real time about the risk of a damage of the steering system whenever the steering wheel is kept in full lock condition for more than a specified time.

The object is achieved by a vehicle driver warning device according to claim 1 and a method for warning a vehicle driver according to claim 10.

Thus configured, the present disclosure permits monitoring the angle of rotation of the steering wheel to detect when the steering wheel reaches a full lock position, a visual and/or audio alert being triggered when the steering wheel is kept in this full lock position for a period of time exceeding a preset period of time.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a block diagram of an embodiment of a vehicle driver warning device of the present invention.

DETAILED DESCRIPTION

A vehicle driver warning device according to an embodiment will be described below with reference to the drawings. As illustrated in FIG. 1, the vehicle driver warning device 100 includes a control unit 10, and, operably coupled thereto, respectively a steering angle sensor 20, a countdown timer 30, a switch 40 and an alarm module.

The steering angle sensor 20 is adapted to sense the angle of rotation of a steering column of a vehicle relative to a reference position on a real time basis and to generate corresponding steering signals. This steering angle sensor 20 may, for example, consist of a rotary encoder that is operably associated with the steering column of the vehicle. This rotary encoder may be chosen among a conductive encoder, an optical encoder, a magnetic encoder, a capacitive encoder and a Hall effect angle encoder. The reference position may correspond to a home position of a steering wheel that is mounted to the steering column, the home position corresponding to the position of the steering wheel when the vehicle wheels are oriented for a straight ahead vehicle motion. The steering wheel rotates relative to this home position until it reaches a full lock position, in which the absolute value of the angle of rotation of the steering column is equal to a maximum value. This maximum value is specifically equal to 180° for a steering wheel rotation of 360°.

The control unit 10 is adapted to receive the steering signals produced by the steering angle sensor 20 and to analyse these steering signals to determine when the absolute value of the real time angle of rotation of the steering column is equal to said maximum value. This determination permits detecting when the steering wheel is positioned in a full lock position.

In that case, the control unit 10 generates a timer activation signal, which is transmitted to the countdown timer 30. In response to said timer activation signal, the countdown timer 30 starts countdown of a preset period of time, which is generally between 5 seconds and 10 seconds. This preset period corresponds to the maximum period of time communicated by the vehicle manufacturer beyond which mechanical damage can occur in the steering system. This preset period may be set or reset through the switch 40.

This preset period countdown may be interrupted by the control unit 10 if the driver rotates the steering wheel such that it moves away from the lock position before the end of the preset period of time. Indeed, in that case, the angle of rotation of the steering column changes sufficiently so that its absolute value is less than the maximum value. This triggers the generation of a timer deactivation signal by the control unit 10, which is sent to the countdown timer 30 to interrupt countdown of the preset period of time. After the interruption, the countdown is then reset to a start value of zero.

If no timer deactivation signal is generated by the control unit 10 before the end of the preset period of time, the control unit 10 produces an alarm activation signal that is communicated to the alarm module 50. In response to this alarm activation signal, the alarm module 50 generates an alarm output that is perceptible to the driver. This alarm output may consist in an audible sound or message, and/or a light signal or effect, and/or a haptic feedback transmitted to the driver via the steering wheel for example. This alarm output helps the driver to take corrective action before a potential damage of the steering system occurs.

It is to be understood that the present invention is not limited to the embodiments described above and illustrated in the drawings; rather, the skilled person will recognize that many changes and modifications may be made within the scope of the appended claims.

The invention claimed is:

1. A vehicle driver warning device comprising:
    a steering angle sensor configured to produce steering signals representative of a real time angle of rotation of a steering column of a vehicle relative to a reference position,
    a control unit operably coupled to the steering angle sensor and configured to receive said steering signals and generate a timer activation signal when an absolute value of the real time angle of rotation of the steering column is equal to a maximum value and a timer deactivation signal when the absolute value of the real time angle of rotation of the steering column is again less than the maximum value after being equal to the maximum value,
    a countdown timer operably coupled to the control unit and configured to receive the timer activation signal and the timer deactivation signal, said countdown timer starting a countdown of a preset period of time whenever said countdown timer receives the timer activation signal and interrupting said countdown timer if said countdown timer receives the timer deactivation signal before the end of the preset period of time,
    an alarm module operably coupled to the control unit and configured to generate an alarm output perceptible to the driver upon receiving an alarm activation signal,
    wherein the control unit is configured to generate and communicate an alarm activation signal to said alarm module at the end of the preset period of time if the control unit determines that the countdown of the preset period of time has not been interrupted.

2. The vehicle driver warning device according to claim 1, wherein the steering angle sensor comprises a rotary encoder operably associated with the steering column.

3. The vehicle driver warning device according to claim 2, wherein the rotary encoder is selected from the group consisting of a conductive encoder, an optical encoder, a magnetic encoder, a capacitive encoder and a Hall effect angle encoder.

4. The vehicle driver warning device according to claim 1, wherein the reference position corresponds to a home position of a steering wheel that is mounted to the steering column.

5. The vehicle driver warning device according to claim 4, wherein the steering wheel is in a full lock position when the absolute value of the real time angle of rotation of the steering column is equal to the maximum value.

6. The vehicle driver warning device according to claim 1, wherein the maximum value is equal to 180°.

7. The vehicle driver warning device according to claim 1, wherein the preset period of time is between 5 seconds and 10 seconds.

8. The vehicle driver warning device according to claim 1, wherein the alarm output is selected from the group comprising an audible alarm, an audible message, a light signal and a haptic feedback.

9. A vehicle comprising a vehicle driver warning device according to claim 1.

10. A method for warning a vehicle driver comprising:
    detecting in real time a steering angle of rotation of a steering column relative to a reference position;
    comparing the detected steering angle of rotation with a maximum value;
    starting countdown of a preset period of time when an absolute value of the angle of rotation of the steering column is equal to a maximum value;
    interrupting said countdown of the preset period of time if the detected steering angle of rotation of the steering column changes sufficiently so that an absolute value of the detected steering angle of rotation is less than the maximum value before the end of the preset period of time;
    activating an alarm output perceptible to the driver at the end of the countdown of the preset period of time if the countdown has not been interrupted.

11. The method according to claim 10, wherein the reference position corresponds to a home position of a steering wheel that is mounted to the steering column.

12. The method according to claim 11, wherein the steering wheel is in a full lock position when the absolute value of a real time steering angle of rotation of the steering column is equal to the maximum value.

13. The method according to claim 10, wherein the maximum value is equal to 180°.

14. The method according to claim 10, wherein the preset period of time is between 5 seconds and 10 seconds.

15. The method according to claim 10, wherein the alarm output is selected from the group comprising an audible alarm, an audible message, a light signal and a haptic feedback.

* * * * *